(12) United States Patent
Cai et al.

(10) Patent No.: US 10,097,105 B2
(45) Date of Patent: Oct. 9, 2018

(54) SYNCHRONOUS RECTIFICATION MODULE

(71) Applicant: DELTA ELECTRONICS (THAILAND) PUBLIC COMPANY LIMITED, Samutprakarn (TH)

(72) Inventors: Youzhun Cai, Samutprakarn (TH); Chengfeng Yu, Samutprakarn (TH); Sanchao Sun, Samutprakarn (TH); Jiajia Ouyang, Samutprakarn (TH)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 56 days.

(21) Appl. No.: 15/485,889

(22) Filed: Apr. 12, 2017

(65) Prior Publication Data
US 2018/0205323 A1    Jul. 19, 2018

(30) Foreign Application Priority Data

Jan. 13, 2017    (CN) ...................... 2017 2 0045787 U

(51) Int. Cl.
*H02M 7/217* (2006.01)
*H01F 27/29* (2006.01)
*H01F 27/28* (2006.01)

(52) U.S. Cl.
CPC ........ *H02M 7/217* (2013.01); *H01F 27/2847* (2013.01); *H01F 27/29* (2013.01)

(58) Field of Classification Search
CPC .................................................. H02M 7/217
USPC ........ 363/127, 144, 146, 147; 361/620, 623, 361/863, 647, 643, 631; 336/225, 223, 336/219, 218, 213
See application file for complete search history.

(56) References Cited

U.S. PATENT DOCUMENTS

| | | | | | |
|---|---|---|---|---|---|
| 3,239,784 | A | * | 3/1966 | Schwartz | B23K 11/24 |
| | | | | | 219/86.1 |
| 4,873,757 | A | * | 10/1989 | Williams | H01F 17/0013 |
| | | | | | 29/602.1 |
| 5,084,958 | A | * | 2/1992 | Yerman | H01F 27/2804 |
| | | | | | 29/602.1 |

(Continued)

*Primary Examiner* — Adolf Berhane
*Assistant Examiner* — Nusrat Quddus
(74) *Attorney, Agent, or Firm* — Kirton McConkie; Evan R. Witt

(57) ABSTRACT

The present invention provides a synchronous rectification module. The synchronous rectification module includes a circuit board, a transformer, two synchronous rectification sets and a grounding set. The transformer includes a primary winding and a secondary electrically-conductive foil winding. The first and second synchronous rectification sets are symmetrically disposed on the circuit board, corresponding to the transformer and electrically connected to a secondary dotted end tap and a secondary synonyms end tap of the secondary electrically-conductive foil winding respectively. The secondary electrically-conductive foil winding of the transformer is disposed nearby a lateral edge of the first or second synchronous rectification set, and the grounding set is disposed along a bottom edge of the circuit board and nearby the bottom edge of the first or second synchronous rectification set, so as to reduce the current path of the secondary synchronous rectification circuit and achieve the purposes of miniaturization and high power density.

28 Claims, 14 Drawing Sheets

(56) References Cited

U.S. PATENT DOCUMENTS

| | | | | |
|---|---|---|---|---|
| 6,160,467 A | * | 12/2000 | Teimorzadeh | H01F 27/2852 336/180 |
| 2004/0208030 A1 | * | 10/2004 | Bhate | H02M 7/003 363/109 |
| 2007/0176584 A1 | * | 8/2007 | Chen | H02M 3/33507 323/282 |
| 2012/0044722 A1 | * | 2/2012 | Cuk | H02M 3/335 363/21.03 |

* cited by examiner

SYNCHRONOUS RECTIFICATION MODULE

FIELD OF THE INVENTION

The present invention relates to a synchronous rectification module, and more particularly to a synchronous rectification module having high power density.

BACKGROUND OF THE INVENTION

The server power gradually tends to be miniaturized with high power density. In the field of servers, a power system is usually constructed by a rack and plural power supply units accommodated in the rack. If the power system has to increase the output power without changing the width of the original-size rack, more power supply units having smaller widths should be employed. However, the output part of the power supply unit needs enough power transmission area for mounting the output rectification devices including for example the isolation transformer, the rectification device, the filter circuit and the output current path. In addition, the power transmission area is increased in accordance with increase of the output current. Thus, in a power supply unit with low-voltage and high current output, the required power transmission area for larger current is regarded as a limitation to reduce the width of the power supply unit. Consequently, it is difficult to miniaturize the power supply unit and increase the power density.

In order to achieve the miniaturization and the high power density, the layout and arrangement of components disposed in the output rectifier circuit of the power supply unit are particularly important. In the conventional power supply unit, after the secondary winding of the transformer is completed, the secondary winding of the transformer is electrically connected to a metal-oxide-semiconductor field-effect transistor (MOSFET) of a synchronous rectifier (SR) and then electrically connected to an output filter circuit through the circuit board. By utilizing the above output rectifier circuit, the electrically-conductive path of rectification at the secondary side is longer, so that the line loss is increased. Moreover the output rectifier circuit at the secondary side includes a lot of components. If the layout of components is unreasonable, the rectification effect is affected adversely and the occupied space is increased at the same time. Consequently, it is difficult to miniaturize the power supply unit and increase the power density.

SUMMARY OF THE INVENTION

The object of the present disclosure is to provide a synchronous rectification module having high power density. In the inventive synchronous rectification module, a transformer, a synchronous rectification set and a filter circuit are integrated together on the same circuit board, or a transformer, a synchronous rectification set, an output filter capacitor, an output filter inductor and a center tap bus are integrated together on the same circuit board, so as to save the space, reduce the loss, improve the rectification efficiency and achieve the miniaturization and the high power density.

Another object of the present disclosure is to provide a synchronous rectification module having high power density. The secondary winding of the transformer is constructed by the electrically-conductive foil winding, which is capable of being inserted on the circuit board directly and connected with the synchronous rectification set on the circuit board, so as to reduce the electrically-conductive path of the rectification at the secondary side, reduce the line loss, improve the efficiency, and resolve the issue of fixing the transformer. In addition, two transformers are symmetrically disposed on the circuit board. The output of the secondary winding is rectified by the synchronous rectification sets and directly connected to a main circuit board through the center tap bus from the middle of the two transformers. Under this circumstance, the electrically-conductive paths of the rectification of the two synchronous rectification sets are the same, and the current-balancing of the two synchronous rectification sets are achieved. Moreover, the current is led to the main circuit board through the center tap bus, so as to reduce the line loss and improve the efficiency, more particularly in a low-voltage and high current output application. Furthermore, the filter capacitors are disposed adjacent to the synchronous rectification set to reduce the path of filtering and enhance the filtering effect. The output filter inductor is constructed by the center tap bus and the magnetic core directly. Consequently, the space between the two transformers is utilized effectively, and the problem of output filtering is also solved.

In accordance with an aspect of the present invention, a synchronous rectification module is provided. The synchronous rectification module includes a circuit board, at least one transformer, two synchronous rectification sets and a grounding set. The transformer includes at least one primary winding and at least one secondary electrically-conductive foil winding. The secondary electrically-conductive foil winding is inserted and disposed on the circuit board and includes a secondary dotted end tap, a secondary synonyms end tap and a secondary center tap. The first synchronous rectification set and the second synchronous rectification set are disposed on the circuit board, corresponding to the transformer, and electrically connected to the secondary dotted end tap and the secondary synonyms end tap respectively. The grounding set is disposed on the circuit board, corresponding to the first synchronous rectification set and the second synchronous rectification set, and electrically connected to the first synchronous rectification set and the second synchronous rectification set. Each of the first synchronous rectification set and the second synchronous rectification set includes a lateral edge and a bottom edge. The secondary electrically-conductive foil winding of the transformer is disposed nearby the lateral edge of the first synchronous rectification set or the lateral edge of the second synchronous rectification set. The grounding set is disposed along a bottom edge of the circuit board and nearby the bottom edge of the first synchronous rectification set and the bottom edge of the second synchronous rectification set.

In accordance with another aspect of the present invention, a synchronous rectification module is provided. The synchronous rectification module includes a circuit board, two transformers, four synchronous rectification sets and a grounding set. The first transformer and the second transformer are disposed on the circuit board and electrically connected to each other. Each of the first transformer and the second transformer comprises at least one primary winding and at least one secondary electrically-conductive foil winding. The secondary electrically-conductive foil winding is inserted and disposed on the circuit board and includes a secondary dotted end tap, a secondary synonyms end tap and a secondary center tap. The first synchronous rectification set and the second synchronous rectification set are disposed on the circuit board, corresponding to the first transformer, and electrically connected to the secondary dotted end tap and the secondary synonyms end tap of the first transformer respectively. The third synchronous rectification set and the fourth synchronous rectification set are disposed on the circuit board, corresponding to the second transformer, and electrically connected to the secondary dotted end tap and the secondary synonyms end tap of the second transformer respectively. The grounding set is disposed on the circuit board, corresponding to the first synchronous rectification set, the second synchronous rectification set, the third synchronous rectification set and the fourth synchronous rectification set, and electrically connected to the first synchronous rectification set, the second synchronous rectification set, the third synchronous rectification set and the fourth synchronous rectification set. Each of the first synchronous rectification set, the second synchronous rectification set, the third synchronous rectification set and the fourth synchronous rectification set includes a lateral edge and a bottom edge. The secondary electrically-conductive foil winding of the first transformer and the secondary electrically-conductive foil winding of the second transformer are disposed nearby the lateral edge of the first synchronous rectification set and the lateral edge of the fourth synchronous rectification set respectively. The grounding set is disposed along a bottom edge of the circuit board and nearby the bottom edge of the first synchronous rectification set, the bottom edge of the second synchronous rectification set, the bottom edge of the third synchronous rectification set, and the bottom edge of the fourth synchronous rectification set.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
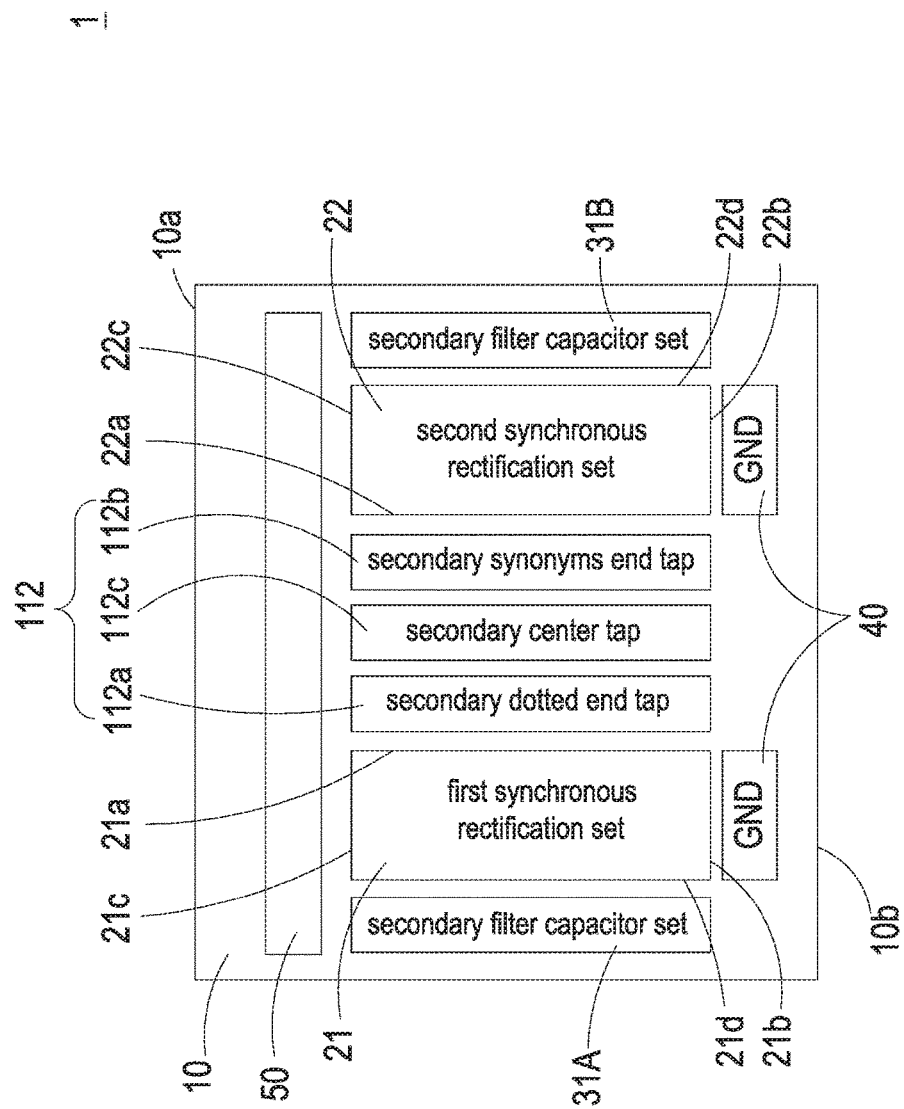
FIG. 1 is a schematic diagram showing a synchronous rectification module according to a first preferred embodiment of the present invention.
Figure 2:
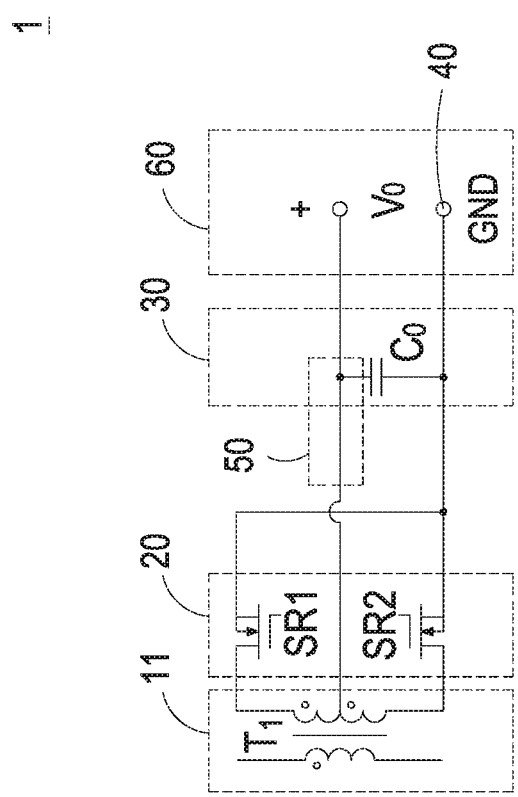
FIG. 2 is a circuit topology showing a synchronous rectification module of a preferred embodiment of the present invention.
Figure 3A:
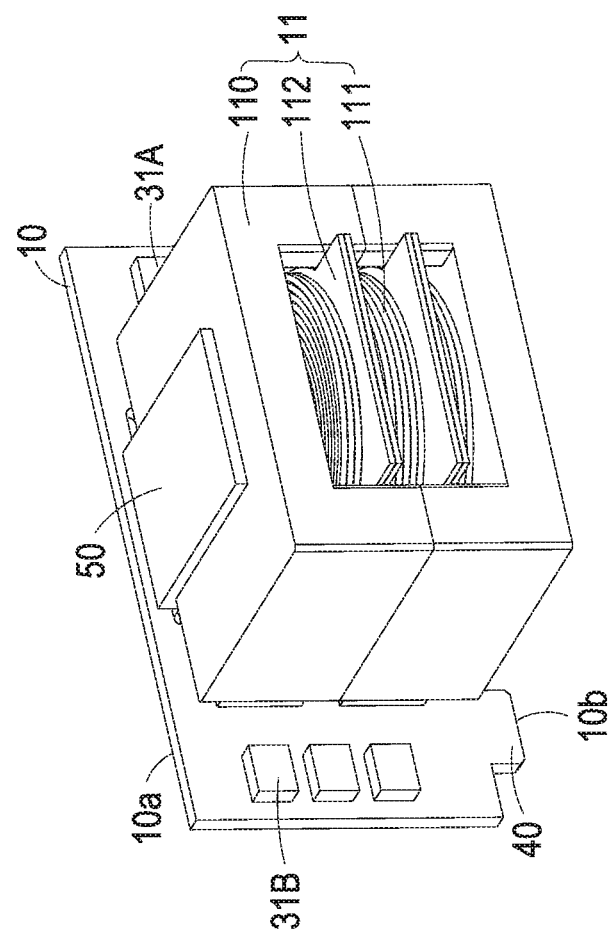
FIGS. 3A and 3B are perspective views showing the structure of the synchronous rectification module of FIG. 1 at different viewing angles.
Figure 3B:
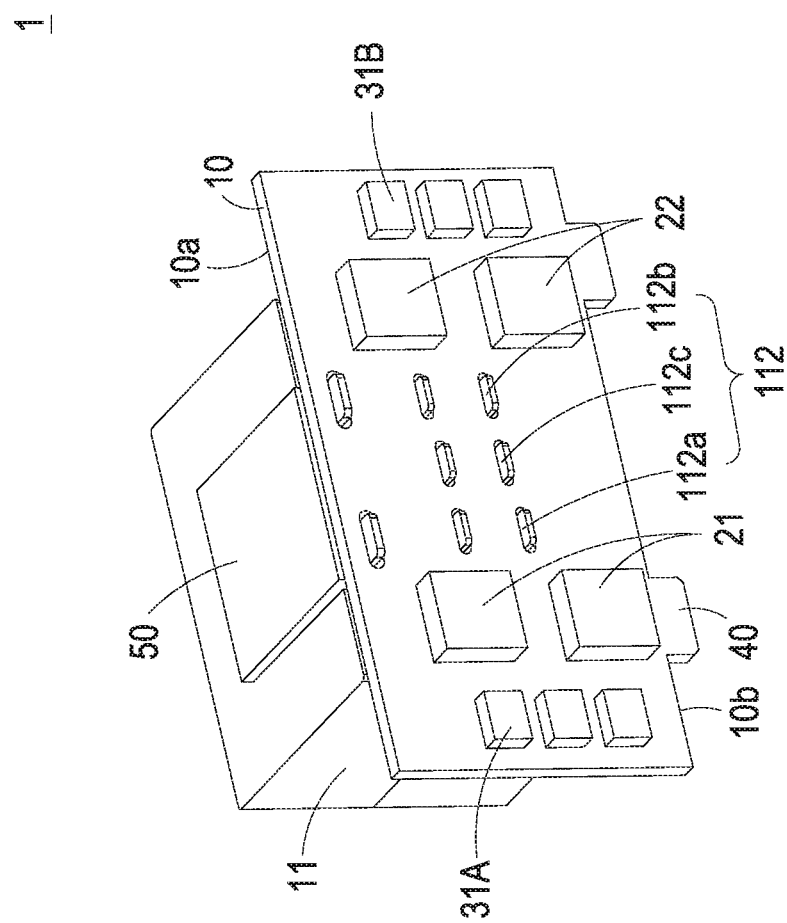
Figure 3C:
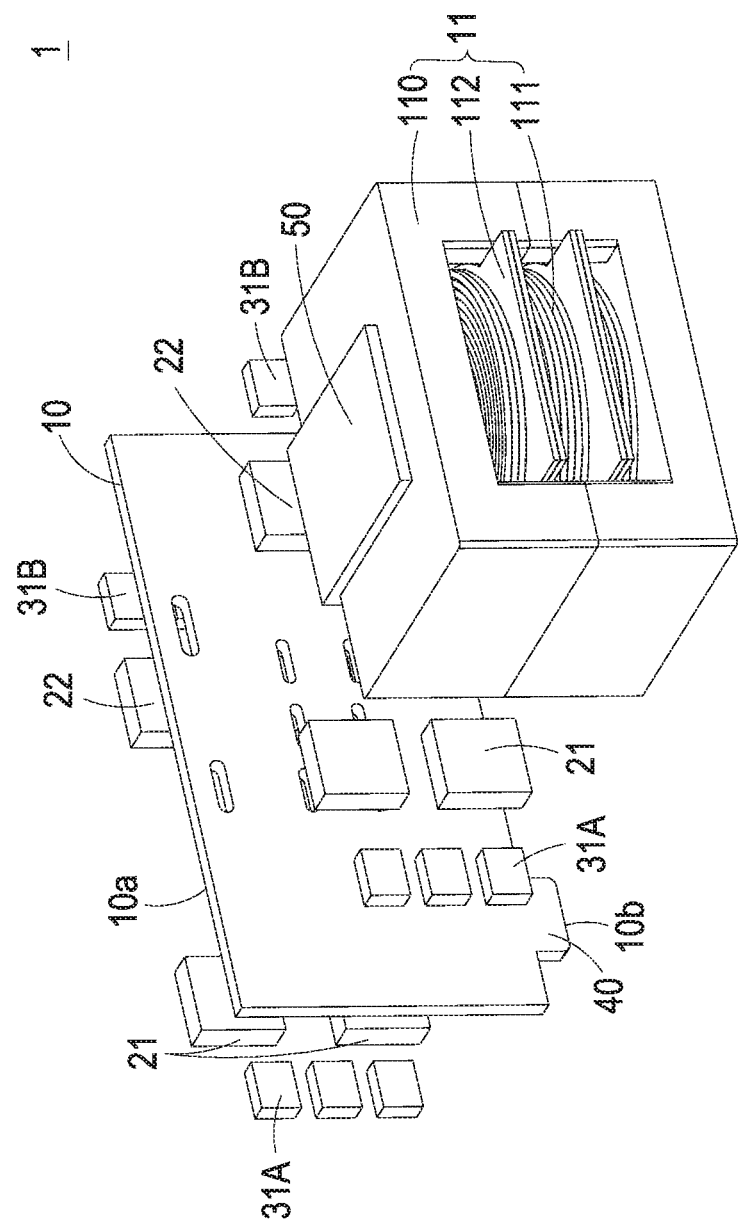
FIG. 3C is a structural exploded view showing the synchronous rectification module of FIG. 1.

FIG. 1 is a schematic diagram showing a synchronous rectification module according to a first preferred embodiment of the present invention. FIG. 2 is a circuit topology showing a synchronous rectification module of a preferred embodiment of the present invention. FIGS. 3A and 3B are perspective views showing the structure of the synchronous rectification module of FIG. 1 at different viewing angles. FIG. 3C is a structural exploded view showing the synchronous rectification module of FIG. 1. As shown in FIGS. 1, 2 and 3A to 3C, the synchronous rectification module 1 is configured to output an output voltage $V_O$. The synchronous rectification module 1 includes a circuit board 10, at least one transformer (T1) 11, at least one pair of a first synchronous rectification set (SR1) 21 and a second synchronous rectification set (SR2) 22, and a grounding set 40 (GND). The transformer 11 includes a magnetic core 110, at least one primary winding 111 and at least one secondary electrically-conductive foil winding 112. The secondary electrically-conductive foil winding 112 is inserted and disposed on the circuit board 10 and includes a secondary dotted end tap 112a, a secondary synonyms end tap 112b and a secondary center tap 112c. In the embodiment, the first synchronous rectification set 21 and the second synchronous rectification set 22 are configured together to form a center tap rectification structure of the transformer T1 of FIG. 2. One terminal of the first synchronous rectification set 21 is electrically connected to the secondary dotted end tap 112a, and one terminal of the second synchronous rectification set 22 is electrically connected to the secondary synonyms end top 112b. The other terminal of the first synchronous rectification set 21 and the other terminal of the second synchronous rectification set 22 are connected to the grounding set 40. Preferably but not exclusively, the construction of the first synchronous rectification set 21 is the same as that of the second synchronous rectification set 22. Each of the first synchronous rectification set 21 and the second synchronous rectification set 22 includes one or more synchronous rectifiers, where the synchronous rectifiers are connected to each other in parallel. Namely, the first synchronous rectification set SR1 and the second synchronous rectification set SR2 of FIG. 2 represent the first synchronous rectification set 21 and the second synchronous rectification set 22 of FIGS. 3A to 3C respectively, where each of the first synchronous rectification set 21 and the second synchronous rectification set 22 includes plural synchronous rectifiers. The first synchronous rectification set 21 and the second synchronous rectification set 22 are corresponding to the transformer 11, disposed on the circuit board 10, and electrically connected to the secondary dotted end tap 112a and the secondary synonyms end tap 112b of the transformer 11 respectively. In the embodiment, each synchronous rectifier includes for example but not limited to Metal-Oxide-Semiconductor Field-Effect Transistor (MOSFET). The grounding set 40 is disposed on the circuit board 10, corresponding to the first synchronous rectification set 21 and the second synchronous rectification set 22, and electrically connected to the first synchronous rectification set 21 and the second synchronous rectification set 22. Each of the first synchronous rectification set 21 and the second synchronous rectification set 22 includes a lateral edge 21*a*, 22*a* and a bottom edge 21*b*, 22*b*. In the embodiment, the secondary center tap 112*c* of the transformer 11 is located between the secondary dotted end tap 112*a* and the secondary synonyms end tap 112*b*. The secondary electrically-conductive foil winding 112 of the transformer 11 is disposed between the first synchronous rectification set 21 and the second synchronous rectification set 22. Namely, the secondary electrically-conductive foil winding 112 of the transformer 11 is disposed between and located nearby the lateral edge 21*a* of the first synchronous rectification set 21 and the lateral edge 22*a* of the second synchronous rectification set 22. On the other hand, the grounding set 40 is disposed along a bottom edge 10*b* of the circuit board 10 and located nearby the bottom edge 21*b* of the first synchronous rectification set 21 and the bottom edge 22*b* of the second synchronous rectification set 22. The current at the secondary side flows through the secondary dotted end tap 112*a* and the secondary synonyms end tap 112*b* of the transformer 11 and further flows to the ground set GND through the first synchronous rectification set 21 and the second synchronous rectification set 22 of the rectifying circuit 20 respectively. Under this circumstance, a shortest current transfer path is achieved. Namely, the current transfer path from the secondary dotted end tap 112*a* to the ground set GND and the current transfer path from the secondary synonyms end tap 112*b* to the ground set GND are reduced. Consequently, the line loss is reduced, and the purposes of improving the rectifying efficiency and increasing the power density are achieved. Moreover, when the circuit board 10 is inserted into a main circuit board (not shown) through the grounding set 40 disposed at the bottom edge 10*b*, a shortest current transfer path is also maintained.

Figure 4:
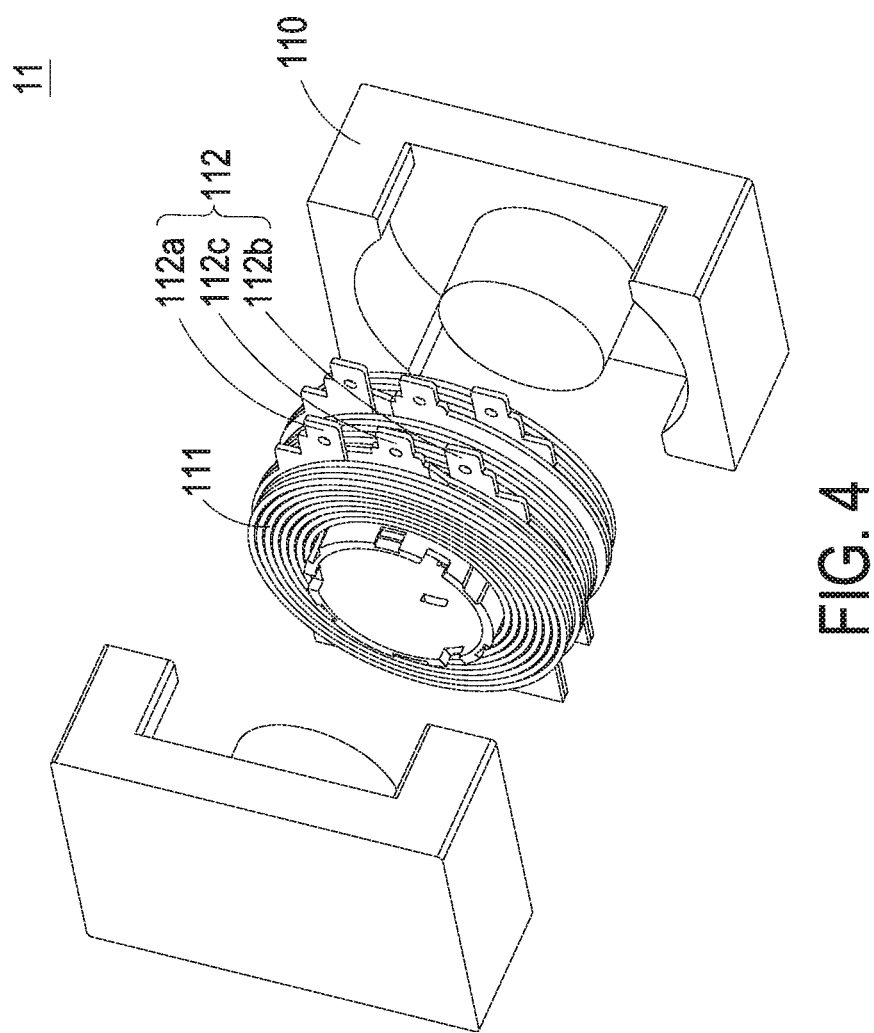
FIG. 4 is a structural exploded view showing the transformer of the synchronous rectification module of FIGS. 3A to 3C.

In the embodiment, the secondary electrically-conductive foil winding 112 of the transformer 11 is inserted on the circuit board 10 directly and electrically connected with the circuit board 10. The secondary electrically-conductive foil winding 112 of the transformer 11 is used as a supporter for supporting the transformer 11. Consequently, additional supporting bracket for the transformer 11 can be omitted and the entire volume of the transformer 11 is reduced. FIG. 4 is a structural exploded view showing the transformer of the synchronous rectification module of FIGS. 3A to 3C. As shown in FIG. 4, the transformer 11 includes a magnetic core 110, the primary winding 111 and the secondary electrically-conductive foil winding 112. The secondary electrically-conductive foil winding 112 includes a plurality of conductive sheet units inserted on the circuit board 10 and connected with each other in parallel through the circuit board 10. Each of the conductive sheet units is a copper sheet. The primary winding 111 is disposed between two adjacent conductive sheet units. Thus, it is ensured that the primary winding 111 is coupled with the secondary electrically-conductive foil winding 112, and it is advantageous for evenly winding the primary winding 111 among the conductive sheet units of the secondary electrically-conductive foil winding 112. Consequently, the utilization area of the window of the magnetic core 110 is increased and the volume of the magnetic core 110 is reduced. In addition, the three leading pins of each conductive sheet unit are inserted on the circuit board 10 and configured as the secondary dotted end tap 112*a*, the secondary synonyms end tap 112*b* and the secondary center tap 112*c* of the secondary electrically-conductive foil winding 112. The secondary dotted end tap 112*a* and the secondary synonyms end tap 112*b* are symmetrically distributed and connected to the first synchronous rectification set 21 and the second synchronous rectification set 22, respectively, so as to form a shortest electrically-conductive path of rectification, reduce the line loss effectively and improve the rectification efficiency.

Please refer to FIGS. 1, 2 and 3A to 3C. The synchronous rectification module 1 further includes a filter circuit 30 connected between the output terminal 60 and the rectifying circuit 20. In the embodiment, the filter circuit 30 includes a pair of secondary filter capacitor sets ($C_0$) 31A and 31B disposed on the circuit board 10 and located away from the secondary electrically-conductive foil winding 112 of the transformer 11 and nearby the other edge 21*d* of the first synchronous rectification set 21 and the other edge 22*d* of the second synchronous rectification set 22 respectively. The secondary filter capacitor sets 31A and 31B of the filter circuit 30 are connected to each other in series or in parallel. In some embodiments, each of the secondary filter capacitor sets 31A and 31B of the filter circuit 30 includes one terminal electrically connected to the grounding set 40, which is connected with the first synchronous rectification set 21 and the second synchronous rectification set 22. Each of the secondary filter capacitor sets 31A and 31B of the filter circuit 30 includes the other terminal electrically connected to the secondary center tap 112*c* of the transformer 11. The synchronous rectification module 1 further includes a center tap bus 50 disposed along a top edge 10*a* of the circuit board 10 and nearby the top edge 21*c* of the first synchronous rectification set 21 and the top edge 22*c* of the second synchronous rectification set 22, and further connected to the secondary center tap 112*c* of the transformer 11, the other terminals of the secondary filter capacitor sets 31A and 31B of the filter circuit 30 and the output terminal 60. As shown in FIG. 1, the secondary center tap 112*c* of the transformer 11 is electrically connected to the secondary filter capacitor sets 31A and 31B of the filter circuit 30 through the center tap bus 50, so that a shortest current transfer path is achieved. Since the current transfer path from the secondary center tap 112*c* to the filter circuit 30 is reduced, the line loss is reduced. Consequently, the power density is increased, the loss is reduced, and the purpose of improving the power efficiency is achieved. It is noted that the first synchronous rectification set 21 and the second synchronous rectification set 22 are symmetrically disposed on two sides of the transformer 11, so as to facilitate to achieve the current equalization. In other embodiment, the filter circuit 30 can be for example but not limited to a LC filter circuit, a CLC filter circuit or a LCL filter circuit.

Figure 5:
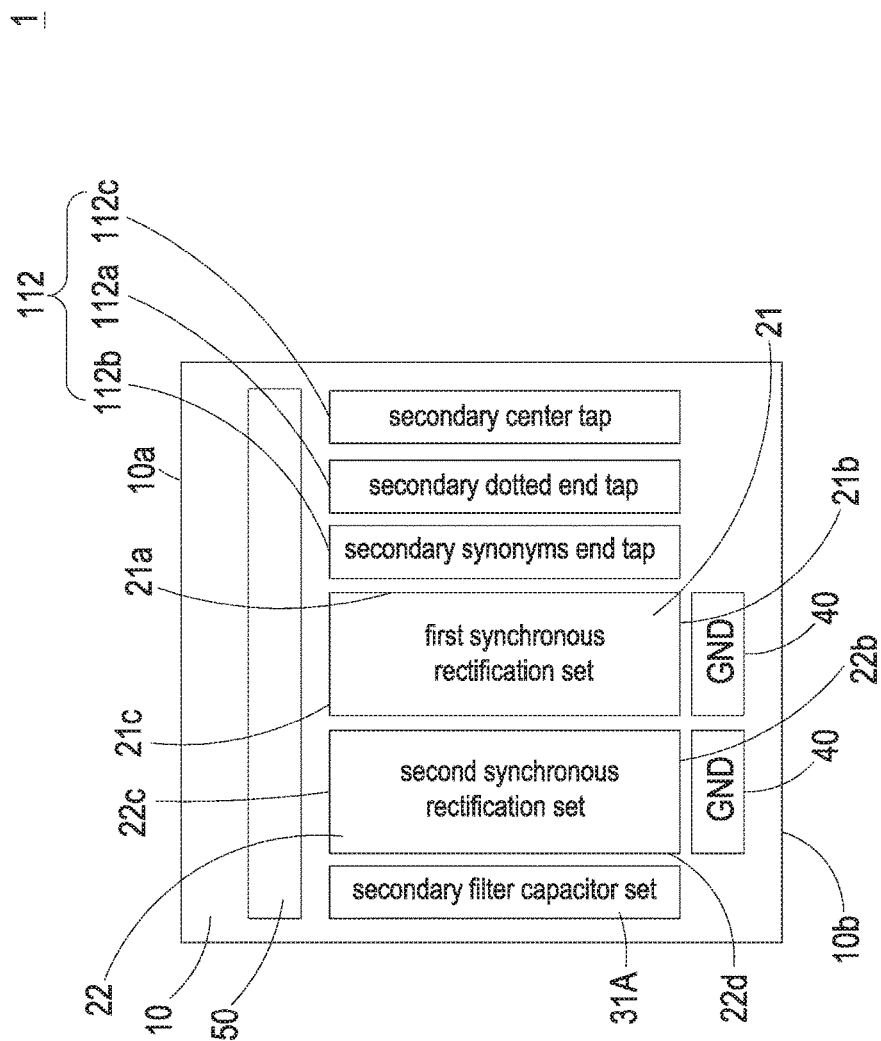
FIG. 5 is a schematic diagram showing a synchronous rectification module according to a second preferred embodiment of the present invention.

FIG. 5 is a schematic diagram showing a synchronous rectification module according to a second preferred embodiment of the present invention. In the embodiment, the structures, elements and functions of the synchronous rectification module 1 are similar to those of the synchronous rectification module 1 in FIG. 1, and are not redundantly described herein. Different from the synchronous rectification module 1 of FIG. 1, in the embodiment, the first synchronous rectification set 21 and the second synchronous rectification set 22 are located nearby each other, and both of the first synchronous rectification set 21 and the second synchronous rectification set 22 are located between the secondary electrically-conductive foil winding 112 of the transformer 11 and the secondary filter capacitor set 31A of the filter circuit 30. In addition, corresponding to the first synchronous rectification set 21 and the second synchronous rectification set 22 located nearby each other, in this embodiment, the secondary dotted end tap 112a of the transformer 11 is located between the secondary synonyms end tap 112b and the secondary center tap 112c, and the secondary center tap 112c is located away from the first synchronous rectification set 21 and the second synchronous rectification set 22. Moreover, the circuit topology of the embodiment is similar to that of FIG. 2, but the filter circuit 30 merely includes one secondary filter capacitor set 31A disposed on the circuit board 10 and located away from the secondary electrically-conductive foil winding 112 of the transformer 11 and nearby the other lateral edge 22d of the second synchronous rectification set 22. As shown in FIGS. 1, 2 and 5, the secondary dotted end tap 112a and the secondary synonyms end tap 112b of the transformer 11 are connected to the grounding set 40 through the first synchronous rectification set 21 and the second synchronous rectification set 22 of the rectifying circuit 20 respectively. Under this circumstance, a shorter current transfer path is achieved. Namely, the current transfer path from the secondary dotted end tap 112a to the grounding set 40 or the current transfer path from the secondary synonyms end tap 112b to the grounding set 40 are reduced. Furthermore, the secondary center tap 112c of the transformer 11 is electrically connected to the secondary filter capacitor set 31A of the filter circuit 30 through the center tap bus 50, so that a shorter current transfer path is achieved. Namely, the current transfer path from the secondary center tap 112c to the filter circuit 30 is shorter. Consequently, the line loss is reduced, and the purpose of improving the rectification efficiency is achieved.

Figure 6:
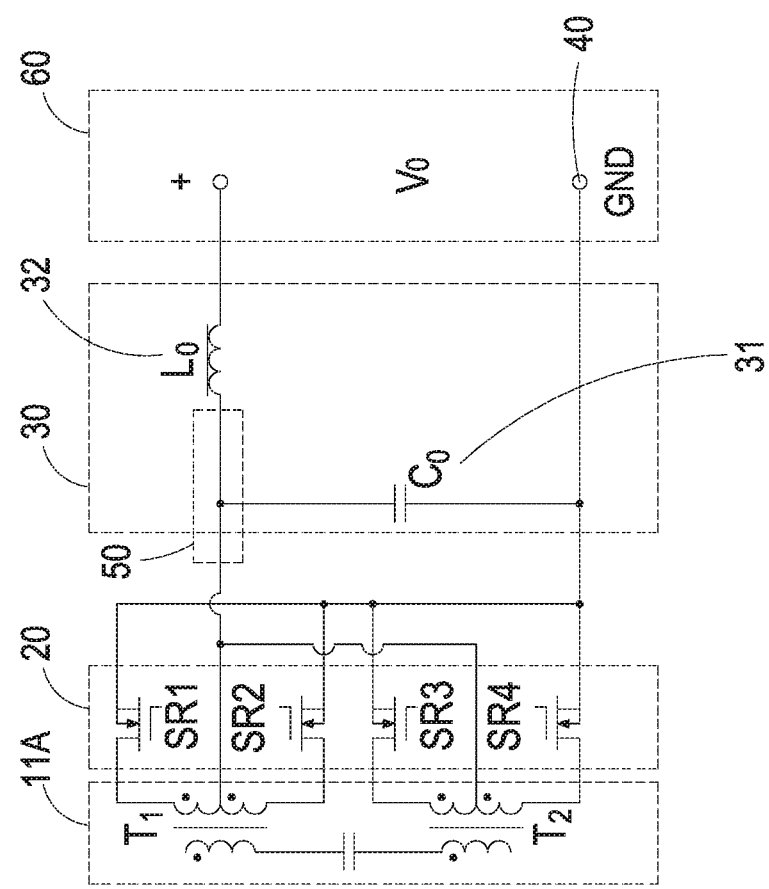
FIG. 6 is a circuit topology showing a synchronous rectification module of another preferred embodiment of the present invention.
Figure 7:
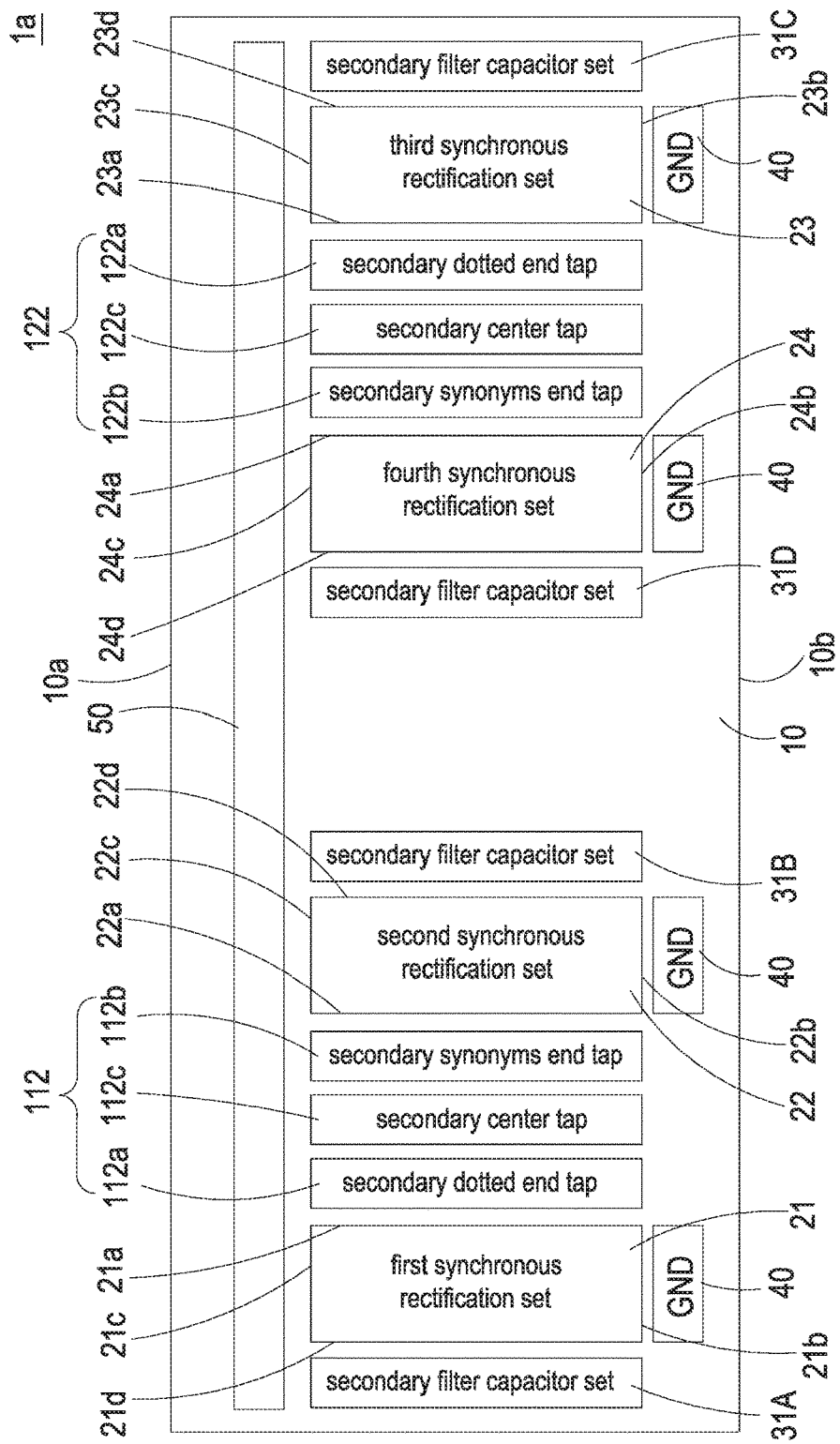
FIG. 7 is a schematic diagram showing a synchronous rectification module according to a third preferred embodiment of the present invention.
Figure 8A:
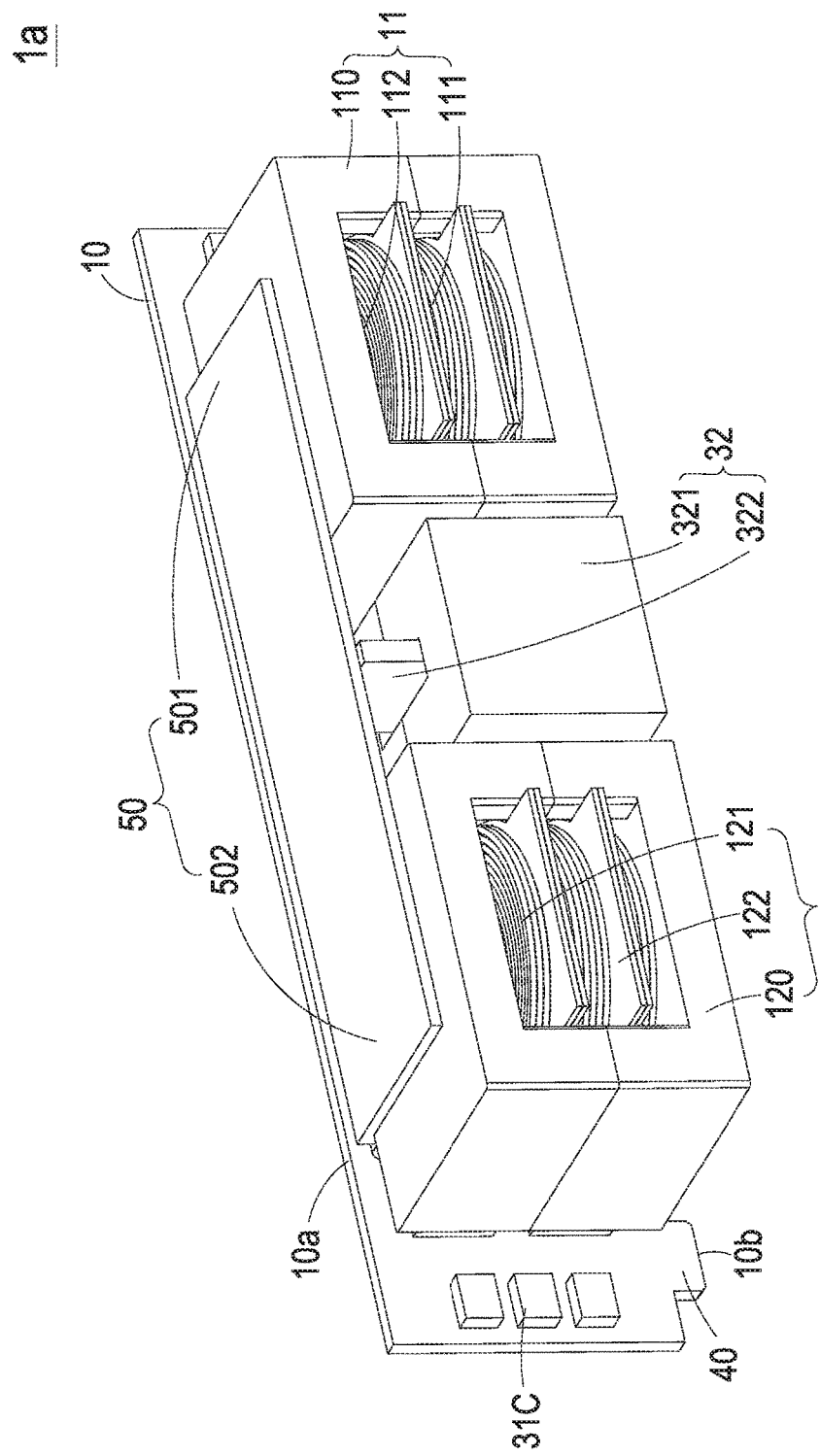
FIGS. 8A and 8B are perspective views showing the structure of the synchronous rectification module of FIG. 7 at different viewing angles.
Figure 8B:
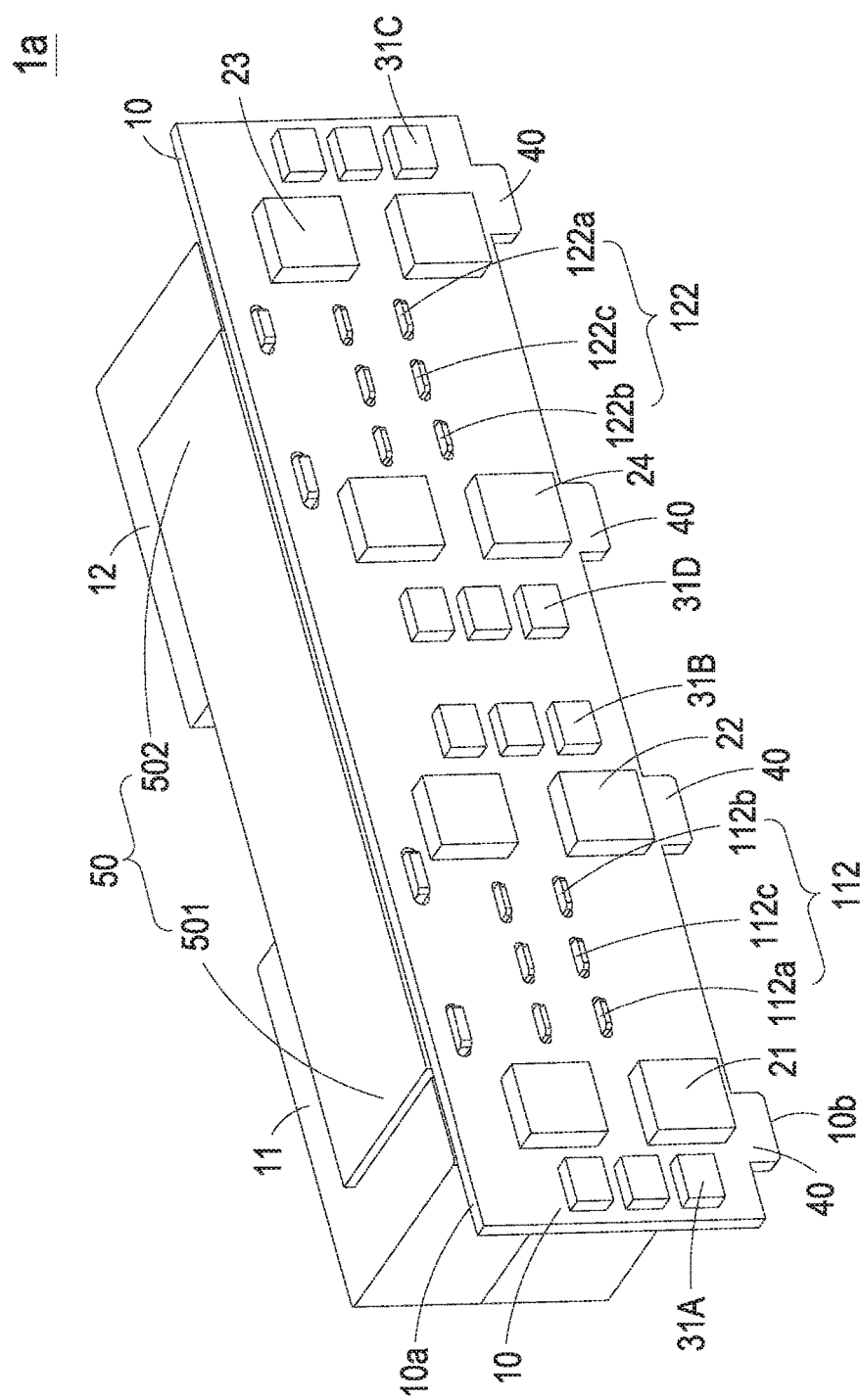
Figure 8C:
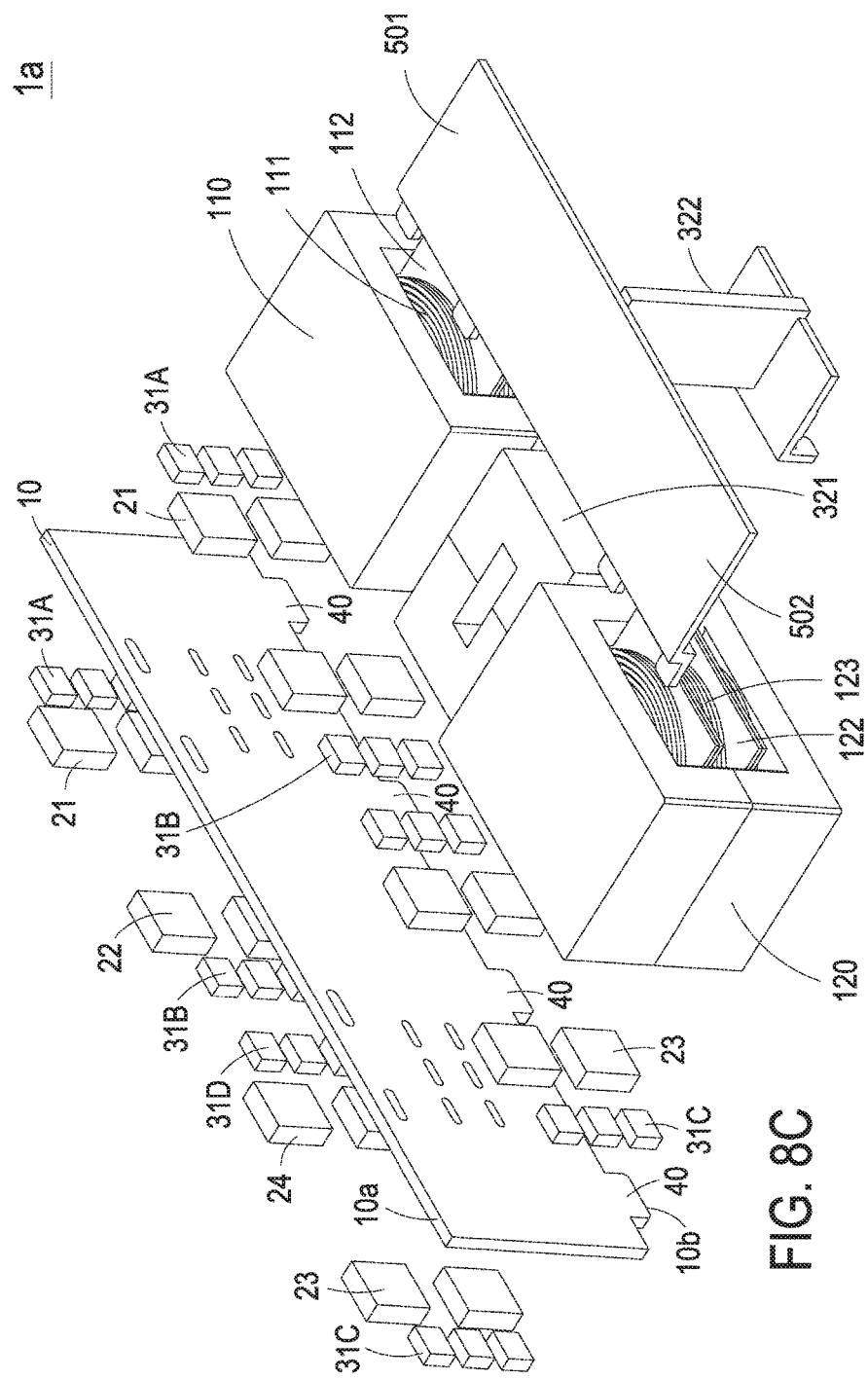
FIG. 8C is a structural exploded view showing the synchronous rectification module of FIG. 7.

FIG. 6 is a circuit topology showing a synchronous rectification module of another preferred embodiment of the present invention. As shown in FIG. 6, in the embodiment, the circuit topology of the synchronous rectification module 1a is similar to that of the synchronous rectification module 1 in FIG. 2. Different from the synchronous rectification module 1 of FIG. 2, the synchronous rectification module 1a of this embodiment includes a transformer circuit 11A having at least one pair of transformers T1 and T2, a rectifying circuit 20 having two pairs of synchronous rectification sets SR1-SR2 and SR3-SR4, and a grounding set 40 (GND). The pair of transformers T1 and T2 and two pairs of synchronous rectification sets SR1-SR2 and SR3-SR4 are symmetrically disposed. In the embodiment, the primary windings of the pair of transformers T1 and T2 are electrically connected to each other in series. Alternatively, in other embodiment, the primary windings of the pair of transformers T1 and T2 are electrically connected to each other in parallel. Similarly, the secondary windings of the pair of transformers T1 and T2 are electrically connected to each other in series or in parallel. According to the circuit topology of FIG. 6, FIG. 7 is a schematic diagram showing a synchronous rectification module according to a third preferred embodiment of the present invention, FIGS. 8A and 8B are perspective views showing the structure of the synchronous rectification module of FIG. 7 at different viewing angles, and FIG. 8C is a structural exploded view showing the synchronous rectification module of FIG. 7. As shown in FIGS. 6, 7 and 8A to 8C, in the embodiment, the structures, elements and functions of the synchronous rectification module 1a are similar to those of the synchronous rectification module 1 in FIG. 1, and are not redundantly described herein. In the embodiment, the synchronous rectification module 1a includes a circuit board 10, a first transformer 11, a second transformer 12, a first synchronous rectification set 21, a second synchronous rectification set 22, a third synchronous rectification set 23, a fourth synchronous rectification set 24 and a grounding set 40. The first transformer 11 and the second transformer 12 are symmetrically disposed on the circuit board 10 and electrically connected to each other. The first transformer 11 includes a magnetic core 110, a primary winding 111, and a secondary electrically-conductive foil winding 112. The second transformer 12 includes a magnetic core 120, a primary winding 121, and a secondary electrically-conductive foil winding 122. The secondary electrically-conductive foil winding 112 of the first transformer 11 and the secondary electrically-conductive foil winding 122 of the second transformer 12 are inserted and disposed on the circuit board 10. The secondary electrically-conductive foil winding 112 of the first transformer 11 includes a secondary dotted end tap 112a, a secondary synonyms end tap 112b and a secondary center tap 112c, and the secondary electrically-conductive foil winding 122 of the second transformer 12 includes a secondary dotted end tap 122a, a secondary synonyms end tap 122b and a secondary center tap 122c. While the first transformer 11 and the second transformer 12 are symmetrically disposed on the circuit board 10, the first synchronous rectification set 21 and the second synchronous rectification set 22 are corresponding to the first transformer 11 and disposed on the circuit board 10, and the third synchronous rectification set 23 and the fourth synchronous rectification set 24 are corresponding to the second transformer 12 and disposed on the circuit board 10. Consequently, the first synchronous rectification set 21 and the second synchronous rectification set 22 are symmetric to the third synchronous rectification set 23 and the fourth synchronous rectification set 24.

In the embodiment, preferably but not exclusively, the structures of the first synchronous rectification set 21, the second synchronous rectification set 22, the third synchronous rectification set 23 and the fourth synchronous rectification set 24 are the same. Each synchronous rectification set includes one or more synchronous rectifiers, where the synchronous rectifiers are connected to each other in parallel. Namely, the first synchronous rectification set SR1, the second synchronous rectification set SR2, the third synchronous rectification set SR3 and the fourth synchronous rectification set SR4 of FIG. 6 represent the first synchronous rectification set 21, the second synchronous rectification set 22, the third synchronous rectification set 23 and the fourth synchronous rectification set 24 of FIGS. 8A to 8C, respectively, where each of the first synchronous rectification set 21, the second synchronous rectification set 22, the third synchronous rectification set 23 and the fourth synchronous rectification set 24 includes plural synchronous rectifiers. In the embodiment, the first synchronous rectification set 21 and the second synchronous rectification set 22 are disposed on and located nearby two sides of the secondary electrically-conductive foil winding 112 of the first transformer 11, and electrically connected to the secondary dotted end tap 112a and the secondary synonyms end tap 112b of the first transformer 11 respectively. The third synchronous rectification set 23 and the fourth synchronous rectification set 24 are disposed on and located nearby two sides of the secondary electrically-conductive foil winding 122 of the second transformer 12, and electrically connected to the secondary dotted end tap 122a and the secondary synonyms end tap 122b of the second transformer 12 respectively. Moreover, the first synchronous rectification set 21 and the second synchronous rectification set 22 are configured together to form the center tap rectification structure of the first transformer T1 of FIG. 6, and the third synchronous rectification set 23 and the fourth synchronous rectification set 24 are configured together to form the center tap rectification structure of the second transformer T2 of FIG. 6. The center tap rectification structure of the first transformer T1 and the center tap rectification structure of the second transformer T2 are connected in parallel to form the rectification structure of the synchronous rectification module 1a. On the other hand, the grounding set 40 is corresponding to the first synchronous rectification set 21, the second synchronous rectification set 22, the third synchronous rectification set 23 and the fourth synchronous rectification set 24, disposed on the circuit board 10, and electrically connected to the first synchronous rectification set 21, the second synchronous rectification set 22, the third synchronous rectification set 23 and the fourth synchronous rectification set 24. Similarly, the first synchronous rectification set 21, the second synchronous rectification set 22, the third synchronous rectification set 23 and the fourth synchronous rectification set 24 include lateral edges 21a, 22a, 23a, 24a and bottom edges 21b, 22b, 23b, 24b, respectively. Namely, in the embodiment, the secondary electrically-conductive foil winding 112 of the first transformer 11 is disposed between and located nearby the lateral edge 21a of the first synchronous rectification set 21 and the lateral edge 22a of the second synchronous rectification set 22. The secondary electrically-conductive foil winding 122 of the second transformer 12 is disposed between and located nearby the lateral edge 23a of the third synchronous rectification set 23 and the lateral edge 24a of the fourth synchronous rectification set 24. The first synchronous rectification set 21 and the second synchronous rectification set 22 arranged on one side and the third synchronous rectification set 23 and the fourth synchronous rectification set 24 arranged on the other side are constructed as mirror symmetry. On the other hand, the grounding set 40 is disposed along a bottom edge 10b of the circuit board 10 and nearby the bottom edge 21b of the first synchronous rectification set 21, the bottom edge 22b of the second synchronous rectification set 22, the bottom edge 23b of the third synchronous rectification set 23, and the bottom edge 24b of the fourth synchronous rectification set 24, and the mirror symmetry of entire structure are still maintained. The secondary center tap 112c of the first transformer 11 is located between the secondary dotted end tap 112a and the secondary synonyms end tap 112b of the first transformer 11, the secondary electrically-conductive foil winding 112 of the first transformer 11 is disposed between and located nearby the lateral edge 21a of the first synchronous rectification set 21 and the lateral edge 22a of the second synchronous rectification set 22. The secondary center tap 122c of the second transformer 12 is located between the secondary dotted end tap 122a and the secondary synonyms end tap 122b of the second transformer 12, and the secondary electrically-conductive foil winding 122 of the second transformer 12 is disposed between and located nearby the lateral edge 23a of the third synchronous rectification set 23 and the lateral edge 24a of the fourth synchronous rectification set 24. Moreover, the grounding set 40 is disposed along a bottom edge 10b of the circuit board 10 and nearby the bottom edge 21b of the first synchronous rectification set 21, the bottom edge 22b of the second synchronous rectification set 22, the bottom edge 23b of the third synchronous rectification set 23, and the bottom edge 24b of the fourth synchronous rectification set 24. The secondary dotted end tap 112a and the secondary synonyms end tap 112b of the first transformer 11 are electrically connected to the grounding set GND through the first synchronous rectification set SR1 and the second synchronous rectification set SR2 respectively. Under this circumstance, a shorter current transfer path is achieved. Namely, the current transfer path from the secondary dotted end tap 112a to the grounding set GND or the current transfer path from the secondary synonyms end tap 112b to the grounding set GND are reduced. In addition, the secondary dotted end tap 122a and the secondary synonyms end tap 122b of the second transformer 12 are electrically connected to the grounding set GND through the third synchronous rectification set SR3 and the fourth synchronous rectification set SR4 respectively. Under this circumstance, a shorter current transfer path is achieved. Namely, the current transfer path from the secondary dotted end tap 122a to the grounding set GND or the current transfer path from the secondary synonyms end tap 122b to the grounding set GND are reduced. Consequently, the purposes of improving the rectifying efficiency is achieved and the power density is increased. On the other hand, the first synchronous rectification set 21 and the second synchronous rectification set 22 respectively disposed on two sides of the secondary electrically-conductive foil winding 112 of the first transformer 11 are mirror-symmetric to each other, and the third synchronous rectification set 23 and the fourth synchronous rectification set 24 respectively disposed on two sides of the secondary electrically-conductive foil winding 122 of the second transformer 12 are mirror-symmetric to each other. The first transformer 11 and the second transformer 12 are mirror-symmetric to each other. Namely, the first synchronous rectification set 21, the first transformer 11 and the second synchronous rectification set 22 arranged on one side of the circuit board 10, and the fourth synchronous rectification set 24, the second transformer 12 and the third synchronous rectification set 23 arranged on the other side of the circuit board 10 are constructed as mirror symmetry, so as to facilitate to achieve the current-balancing. On this basis, the effect of the foregoing shortest current transfer path can be strengthened to effectively reduce the loss. Consequently, the rectification efficiency is enhanced and the power density is increased.

Please refer to FIGS. 6, 7 and 8A to 8C. The synchronous rectification module 1a further include a filter circuit 30 connected the output terminal 60 and the rectifying circuit 20. The filter circuit 30 of the synchronous rectification module 1a includes a pair of secondary filter capacitor sets 31A and 31B corresponding to the first transformer 11 and a pair of secondary filter capacitor sets 31C and 31D corresponding to the second transformer 12. The secondary filter capacitor sets 31A, 31B, 31C and 31D are connected in series or in parallel. In an embodiment, the secondary filter capacitor sets 31A and 31B of the first transformer 11 are disposed on the circuit board 10 and located away from the secondary electrically-conductive foil winding 112 of the first transformer 11 and nearby the other edge 21d of the first synchronous rectification set 21 and the other edge 22d of the second synchronous rectification set 22 respectively. The terminals of the secondary filter capacitor sets 31A and 31B are respectively connected to the grounding set 40, which is connected with the first synchronous rectification set 21 and the second synchronous rectification set 22. Furthermore, the secondary filter capacitor sets 31C and 31D of the second transformer 12 are disposed on the circuit board 10 and located away from the secondary electrically-conductive foil winding 122 of the second transformer 12 and nearby the other edge 23d of the third synchronous rectification set 23 and the other edge 24d of the fourth synchronous rectification set 24 respectively. The terminals of the secondary filter capacitor sets 31C and 31D are respectively connected to the grounding set 40, which is connected with the third synchronous rectification set 23 and the fourth synchronous rectification set 24. On other hand, the other terminals of the secondary filter capacitor sets 31A and 31B are respectively connected to the secondary center tap 112c of the first transformer 11, and the other terminals of the secondary filter capacitor sets 31C and 31D are respectively connected to the secondary center tap 122c of the second transformer 12. The synchronous rectification module 1a further includes a center tap bus 50 disposed along a top edge 10a of the circuit board 10 and nearby the top edge 21c of the first synchronous rectification set 21, the top edge 22c of the second synchronous rectification set 22, the top edge 23c of the third synchronous rectification set 23 and the top edge 24c of the fourth synchronous rectification set 24. The center tap bus 50 includes a first path bus 501 corresponding to the first transformer 11 and a second path bus 502 corresponding to the second transformer 12. The first path bus 501 and the second path bus 502 are both disposed along the top edge 10a of the circuit board 10 and inserted on the circuit board 10. In some embodiments, the first path bus 501 and the second path bus 502 are for example but not limited to a copper bus and constructed in one-piece. In the embodiment, the secondary center tap 112c of the first transformer 11 and the secondary center tap 122c of the second transformer 12 are electrically connected to the first path bus 501 and the second path bus 502 of the center tap bus 50, respectively, and further connected to the secondary filter capacitor sets 31A, 31B, 31C and 31D of the filter circuit 30 through the first path bus 501 and the second path bus 502 of the center tap bus 50, respectively. Under this circumstance, a shorter current transfer path is achieved. The secondary electrically-conductive foil winding 112 of the first transformer 11 and the secondary electrically-conductive foil winding 122 of the second transformer 12 are inserted on the circuit board 10 directly and configured as the supporters for supporting the first transformer 11 and the second transformer 12. Consequently, additional supporting brackets for the transformers are omitted and the entire volumes of the first transformer 11 and the second transformer 12 are reduced. Alternatively, the structural supports of the first transformer 11 and the second transformer 12 and the structural supports of the first path bus 501 and the second path bus 502 can be integrated and utilized together.

In some embodiments, the filter circuit 30 further includes a filter inductor 32 ($L_O$) disposed between the first transformer 11 and the second transformer 12. As shown in FIGS. 8A to 8C, the filter inductor 32 includes a magnetic core 321 and a conductive bus 322. The conductive bus 322 is vertical to the circuit board 10 and passes through a hollow portion of the magnetic core 321. The conductive bus 322 is further electrically connected to the secondary center tap 112c of the first transformer 11 through the foregoing first path bus 501 and electrically connected to the secondary center tap 122c of the second transformer 12 through the foregoing second path bus 502, respectively. In the embodiment, preferably but not exclusively, one end of the conductive bus 322 is connected with the connection portion of the first path bus 501 and the second path bus 502 and constructed together in one-piece. According to the concept of the present invention, the secondary center tap 112c of the first transformer 11 and the secondary center tap 122c of the second transformer 12 are formed after the secondary electrically-conductive foil windings 112 and 122 are inserted on the circuit board 10 by for example but not limited to a soldering method. The first path bus 501 and the second path bus 502 are disposed nearby the secondary center tap 112c of the first transformer 11 and the secondary center tap 122c of the second transformer 12, respectively. The connection portion of the first path bus 501 and the second path bus 502 is located between the first transformer 11 and the second transformer 12, and electrically connected to one end of the conductive bus 322. The conductive bus 322 passes through the hollow portion of the magnetic core 321 so as to form the filter inductor 32 ($L_O$). It is noted that the secondary center tap 112c of the first transformer 11 and the secondary center tap 122c of the second transformer 12 are disposed symmetrically so as to facilitate to perform the current-balancing. In a case that the filter inductor is embedded, the lengths of the first path bus 501 and the second path bus 502 of the center tap bus 50 are reduced. Consequently, the current transfer path from the secondary center taps to the filter inductor is shorter, the line loss and the current loss are reduced, and the efficiency is enhanced. In addition, the layout of the filter inductor 32 is more advantageous for space applications. As shown in FIGS. 8A to 8C, the constituent elements are stacked in a staggered arrangement, so that the overall height of the synchronous rectifying module 1a is accordant and the vertical height utilization ratio and the space utilization efficiency of the synchronous rectification module 1a are improved. The power density of the synchronous rectification module 1a is increased accordingly.

Figure 9:
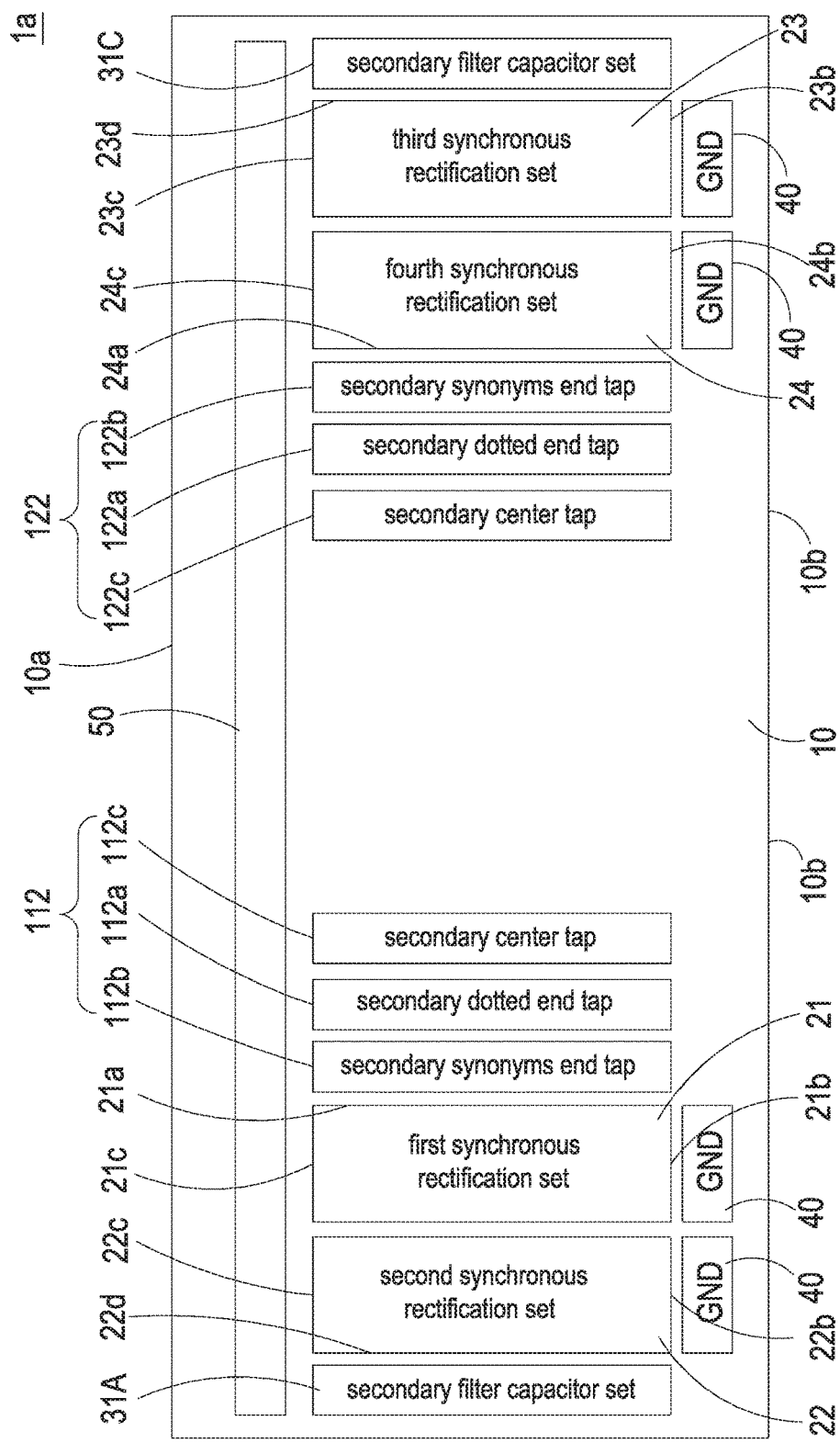
FIG. 9 is a schematic diagram showing a synchronous rectification module according to a fourth preferred embodiment of the present invention.

FIG. 9 is a schematic diagram showing a synchronous rectification module according to a fourth preferred embodiment of the present invention. In the embodiment, the structures, elements and functions of the synchronous rectification module 1a are similar to those of the synchronous rectification module 1a in FIG. 7, and are not redundantly described herein. Different from the synchronous rectification module 1a of FIG. 7, in the embodiment, the first synchronous rectification set 21 and the second synchronous rectification set 22 both corresponding to the first transformer 11 are located nearby each other. The first synchronous rectification set 21 and the second synchronous rectification set 22 are located between the first transformer 11 and the secondary filter capacitor set 31A of the filter circuit 30. Moreover, the third synchronous rectification set 23 and the fourth synchronous rectification set 24 both corresponding to the second transformer 12 are located nearby each other. The third synchronous rectification set 23 and the fourth synchronous rectification set 24 are located between the second transformer 12 and the secondary filter capacitor set 31C of the filter circuit 30. In the embodiment, the secondary dotted end tap 112a of the first transformer 11 is located between the secondary synonyms end tap 112b and the secondary center tap 112c of the first transformer 11, and the secondary center tap 112c of the first transformer 11 is located away from the first synchronous rectification set 21 and the second synchronous rectification set 22. The secondary dotted end tap 122a of the second transformer 12 is located between the secondary synonyms end tap 122b and the secondary center tap 122c of the second transformer 12, and the secondary center tap 122c of the second transformer 12 is located away from the third synchronous rectification set 23 and the fourth synchronous rectification set 24. In addition, the secondary filter capacitor set 31A of the filter circuit 30 is disposed on the circuit board 10 and located away from the secondary electrically-conductive foil winding 112 of the first transformer 11 and nearby the other edge 22d of the second synchronous rectification set 22. The secondary filter capacitor set 31C of the filter circuit 30 is disposed on the circuit board 10 and located away from the secondary electrically-conductive foil winding 122 of the second transformer 12 and nearby the other edge 23d of the third synchronous rectification set 23. Moreover, the secondary filter capacitor set 31A and the secondary filter capacitor set 31C are located away from each other and disposed nearby two opposite outer edges of the circuit board 10 respectively. The position of the filter inductor $L_O$ of the filter circuit 30 is similar to that of FIGS. 8A to 8C, and are not redundantly described herein. Namely, the secondary filter capacitor set 31A, the second synchronous rectification set 22, the first synchronous rectification set 21 and the first transformer 11 arranged on one side of the circuit board 10, and the secondary filter capacitor set 31C, the third synchronous rectification set 23, the fourth synchronous rectification set 24 and the second transformer 12 arranged on the other side of the circuit board 10 are constructed as mirror symmetry. The secondary dotted end tap 112a and the secondary synonyms end tap 112b of the first transformer 11 are electrically connected to the grounding set GND through the first synchronous rectification set SR1 and the second synchronous rectification set SR2 respectively. Under this circumstance, a shorter current transfer path is achieved. Moreover, the secondary dotted end tap 122a and the secondary synonyms end tap 122b of the second transformer 12 are electrically connected to the grounding set GND through the third synchronous rectification set SR3 and the fourth synchronous rectification set SR4 respectively. Under this circumstance, a shorter current transfer is achieved. On the other hand, the secondary center tap 112c of the first transformer 11 and the secondary center tap 122c of the second transformer 12 are electrically connected to the secondary filter capacitor sets 31A and 31C and the filter inductor $L_O$ through the center tap bus 50. Under this circumstance, a shorter current transfer path is achieved. Consequently, the purposes of reducing the line loss of the rectification path and enhancing the rectification efficiency are achieved.

Figure 10:
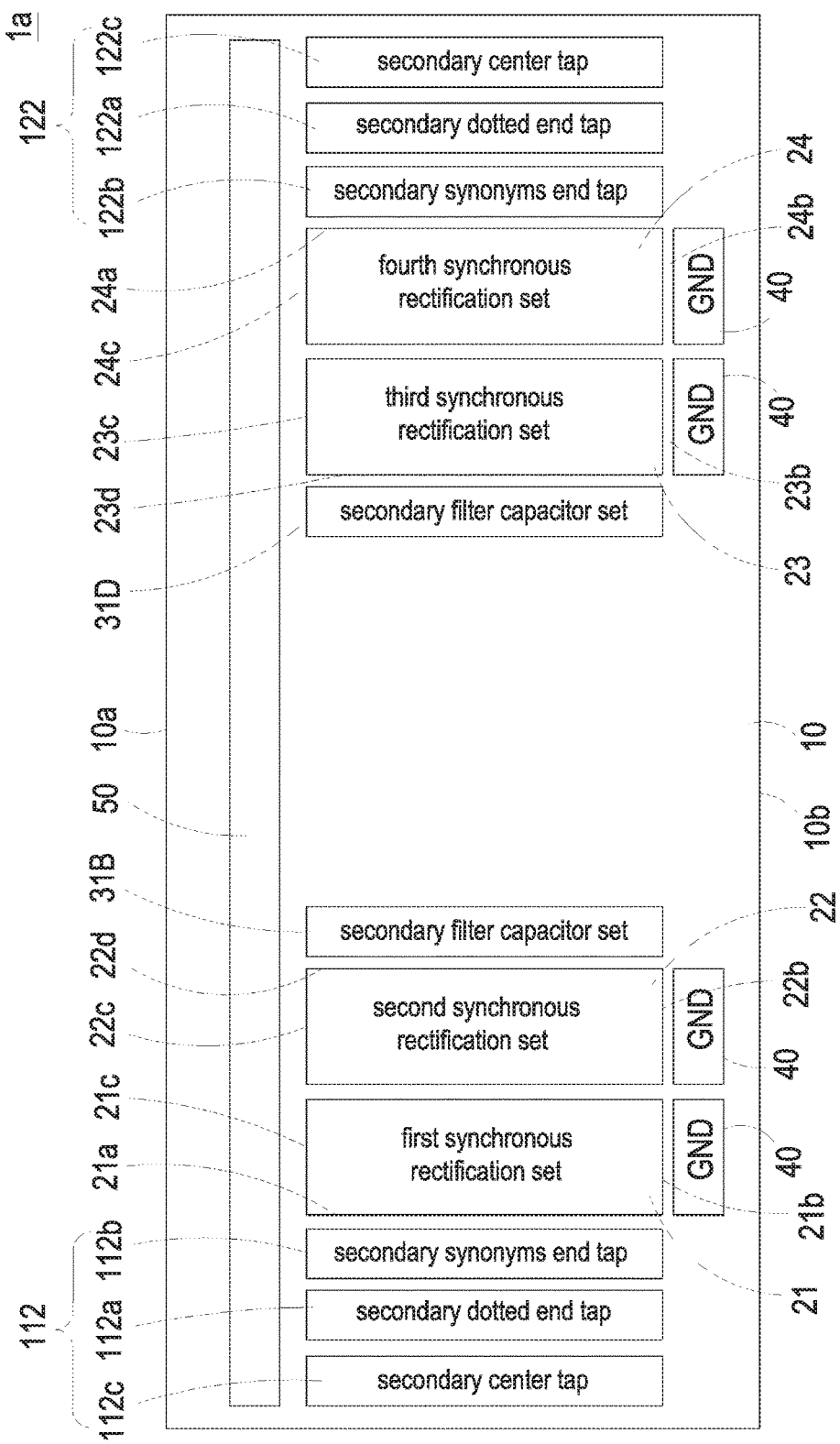
FIG. 10 is a schematic diagram showing a synchronous rectification module according to a fifth preferred embodiment of the present invention.

FIG. 10 is a schematic diagram showing a synchronous rectification module according to a fifth preferred embodiment of the present invention. In the embodiment, the structures, elements and functions of the synchronous rectification module 1a are similar to those of the synchronous rectification module 1a in FIG. 9, and are not redundantly described herein. Different from the synchronous rectification module 1a of FIG. 9, in the embodiment, the secondary center tap 112c of the first transformer 11 and the secondary center tap 122c of the second transformer 12 are disposed on the circuit board 10 and located away from each other and nearby two opposite outer edges of the circuit board 10 respectively. The first transformer 11, the first synchronous rectification set 21, the second synchronous rectification set 22 and the secondary filter capacitor set 31B arranged on one side of the circuit board 10, and the second transformer 12, the fourth synchronous rectification set 24, the third synchronous rectification set 23 and the secondary filter capacitor set 31D arranged on the other side of the circuit board 10 are constructed as mirror symmetry. The secondary dotted end tap 112a and the secondary synonyms end tap 112b of the first transformer 11 are electrically connected to the grounding set GND through the first synchronous rectification set SR1 and the second synchronous rectification set SR2 respectively. Under this circumstance, a shorter current transfer path is achieved. Moreover, the secondary dotted end tap 122a and the secondary synonyms end tap 122b of the second transformer 12 are electrically connected to the grounding set GND through the third synchronous rectification set SR3 and the fourth synchronous rectification set SR4 respectively. Under this circumstance, a shorter current transfer path is achieved. On the other hand, the secondary center tap 112c of the first transformer 11 and the secondary center tap 122c of the second transformer 12 are electrically connected to the secondary filter capacitor sets 31B and 31D and the filter inductor $L_O$ through the center tap bus 50. Under this circumstance, a shorter current transfer path is achieved. Consequently, the purposes of reducing the line loss of the rectification path and enhancing the rectification efficiency are achieved.

It is noted that the synchronous rectification modules 1a in the foregoing embodiments of FIGS. 7, 9 and 10 are configured as mirror symmetry arrangement to achieve a detailed circuit of the synchronous rectification module 1a shown in FIG. 6. Since each transformer is provided with two rectifying circuits symmetrically arranged and two transformers are in symmetry. Consequently, the current-balancing is performed. On this basis, the paths among the taps of transformers, the synchronous rectification sets and the grounding set are reduced. Consequently, the loss is reduced and the rectification efficiency is enhanced. On the other hand, the secondary electrically-conductive foil winding 112 of the first transformer 11 and the secondary electrically-conductive foil winding 122 of the second transformer 12 are directly inserted and fixed on the circuit board 10, and can be configured as supporters for supporting the transformers. Consequently, additional supporting brackets for transformers are omitted, and the cost is saved and the entire volumes of the transformers are reduced. Certainly, by utilizing the conductive sheet units as the secondary winding, it facilitates the taps to be disposed in symmetry, and it is advantageous for evenly winding the primary winding between the secondary electrically-conductive foil winding. Consequently, the utilization area of the window of the magnetic core is increased and the volume of the magnetic core is reduced. The shorter current transfer paths among the taps of transformers, the synchronous rectification sets and the grounding set are maintained. Certainly, the arrangement of the center tap bus 50 and the output filter inductor 32, together constructed by such as a copper bus disposed between the two symmetrical transformers, is not only capable of being integrated to achieve a shorter current transfer path or a shorter electrically-conductive path, but also advantageous for increasing the space occupancy. The synchronous rectification module of the present invention includes the transformer, the synchronous rectification sets, the output filter capacitors, the center tap bus and the output filter inductor evenly stacked and symmetrically disposed on the circuit board, so that the overall height of the synchronous rectification module is accordant and the vertical height utilization ratio and the space utilization efficiency of the synchronous rectification module are improved. The power density of the synchronous rectification module is enhanced accordingly.

In summary, the present disclosure provides a synchronous rectification module to save the space, reduce the loss, improve the rectification efficiency and achieve the miniaturization and the high power density. Some embodiments further discloses a synchronous rectification module to resolve the issue of fixing the transformer, reduce the line loss and improve the efficiency, more particularly to reduce the path of filtering and enhance the filtering effect. Certainly, all embodiments of the present disclosure are illustrative in nature and not restrictive.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A synchronous rectification module, comprising:
    a circuit board;
    at least one transformer including at least one primary winding and at least one secondary electrically-conductive foil winding, wherein the secondary electrically-conductive foil winding is inserted and disposed on the circuit board and includes a secondary dotted end tap, a secondary synonyms end tap and a secondary center tap;
    a first synchronous rectification set and a second synchronous rectification set disposed on the circuit board, corresponding to the transformer, and electrically connected to the secondary dotted end tap and the secondary synonyms end tap respectively; and
    a grounding set disposed on the circuit board, corresponding to the first synchronous rectification set and the second synchronous rectification set, and electrically connected to the first synchronous rectification set and the second synchronous rectification set;
    wherein each of the first synchronous rectification set and the second synchronous rectification set includes a lateral edge and a bottom edge, the secondary electrically-conductive foil winding of the transformer is disposed nearby the lateral edge of the first synchronous rectification set or the lateral edge of the second synchronous rectification set, and the grounding set is disposed along a bottom edge of the circuit board and nearby the bottom edge of the first synchronous rectification set and the bottom edge of the second synchronous rectification set.

2. The synchronous rectification module according to claim 1, further comprising a filter circuit located away from the secondary electrically-conductive foil winding of the transformer and nearby the first synchronous rectification set and the second synchronous rectification set and disposed on the circuit board, wherein one terminal of the filter circuit is electrically connected to the first synchronous rectification set and the second synchronous rectification set, and the other terminal of the filter circuit is electrically connected to the secondary center tap of the transformer.

3. The synchronous rectification module according to claim 2, further comprising a center tap bus disposed on the circuit board and connected between the secondary center tap of the transformer and the filter circuit.

4. The synchronous rectification module according to claim 2, the secondary electrically-conductive foil winding of the transformer is located between the lateral edge of the first synchronous rectification set and the lateral edge of the second synchronous rectification set.

5. The synchronous rectification module according to claim 4, wherein the secondary center tap is located between the secondary dotted end tap and the secondary synonyms end tap.

6. The synchronous rectification module according to claim 4, wherein the filter circuit comprises at least one pair of secondary filter capacitor sets disposed on the circuit board and located away from the secondary electrically-conductive foil winding of the transformer and nearby the other edge of the first synchronous rectification set and the other edge of the second synchronous rectification set respectively.

7. The synchronous rectification module according to claim 2, wherein the first synchronous rectification set and the second synchronous rectification set are located nearby each other, and the first synchronous rectification set and the second synchronous rectification set are located between the secondary electrically-conductive foil winding of the transformer and the filter circuit.

8. The synchronous rectification module according to claim 7, wherein the secondary dotted end tap is located between the secondary synonyms end tap and the secondary center tap, and the secondary center tap is located away from the first synchronous rectification set and the second synchronous rectification set.

9. The synchronous rectification module according to claim 7, wherein the filter circuit comprises at least one secondary filter capacitor set disposed on the circuit board and located away from the secondary electrically-conductive foil winding of the transformer and nearby the other lateral edge of the second synchronous rectification set.

10. The synchronous rectification module according to claim 1, wherein each of the first synchronous rectification set and the second synchronous rectification set comprises a plurality of synchronous rectifiers, wherein the synchronous rectifiers are connected to each other in parallel.

11. The synchronous rectification module according to claim 1, wherein the secondary electrically-conductive foil winding comprises a plurality of conductive sheet units, and the primary winding is disposed between two adjacent conductive sheet units, wherein each of the conductive sheet units is a copper sheet.

12. A synchronous rectification module, comprising:
    a circuit board;
    a first transformer and a second transformer disposed on the circuit board and electrically connected to each other, wherein each of the first transformer and the second transformer comprises at least one primary winding and at least one secondary electrically-conductive foil winding, wherein the secondary electrically-conductive foil winding is inserted and disposed on the circuit board and includes a secondary dotted end tap, a secondary synonyms end tap and a secondary center tap;
    a first synchronous rectification set and a second synchronous rectification set disposed on the circuit board, corresponding to the first transformer, and electrically connected to the secondary dotted end tap and the secondary synonyms end tap of the first transformer respectively;
    a third synchronous rectification set and a fourth synchronous rectification set disposed on the circuit board, corresponding to the second transformer, and electrically connected to the secondary dotted end tap and the secondary synonyms end tap of the second transformer respectively; and
    a grounding set disposed on the circuit board, corresponding to the first synchronous rectification set, the second synchronous rectification set, the third synchronous rectification set and the fourth synchronous rectification set, and electrically connected to the first synchronous rectification set, the second synchronous rectification set, the third synchronous rectification set and the fourth synchronous rectification set;
    wherein each of the first synchronous rectification set, the second synchronous rectification set, the third synchronous rectification set and the fourth synchronous rectification set includes a lateral edge and a bottom edge, the secondary electrically-conductive foil winding of the first transformer and the secondary electrically-conductive foil winding of the second transformer are disposed nearby the lateral edge of the first synchronous rectification set and the lateral edge of the fourth synchronous rectification set respectively, and the grounding set is disposed along a bottom edge of the circuit board and nearby the bottom edge of the first synchronous rectification set, the bottom edge of the second synchronous rectification set, the bottom edge of the third synchronous rectification set, and the bottom edge of the fourth synchronous rectification set.

13. The synchronous rectification module according to claim 12, wherein the first transformer and the second transformer are mirror-symmetric to each other and disposed on the circuit board.

14. The synchronous rectification module according to claim 12, wherein the first synchronous rectification set and the second synchronous rectification set are correspondingly configured with the secondary center tap of the first transformer, and the third synchronous rectification set and the fourth synchronous rectification set are correspondingly configured with the secondary center tap of the second transformer.

15. The synchronous rectification module according to claim 12, wherein the second synchronous rectification set and the third synchronous rectification set are located nearby the secondary electrically-conductive foil winding of the first transformer and the secondary electrically-conductive foil winding of the second transformer respectively, or nearby the first synchronous rectification set and the fourth synchronous rectification set respectively.

16. The synchronous rectification module according to 12, further comprising a filter circuit including a plurality of secondary filter capacitor sets, wherein the secondary filter capacitor sets are disposed on the circuit board and located nearby the first synchronous rectification set, the second synchronous rectification set, the third synchronous rectification set and the fourth synchronous rectification set respectively, wherein the secondary filter capacitor sets include plural first terminals electrically connected with the first synchronous rectification set, the second synchronous rectification set, the third synchronous rectification set and the fourth synchronous rectification set respectively, and plural second terminals electrically connected with the secondary center tap of the first transformer and the secondary center tap of the second transformer.

17. The synchronous rectification module according to 16, wherein the first transformer is disposed nearby and located between the first synchronous rectification set and the second synchronous rectification set, and the second transformer is disposed nearby and located between the third synchronous rectification set and the fourth synchronous rectification set, wherein the first synchronous rectification set and the second synchronous rectification set are located nearby the secondary dotted end tap and the secondary synonyms end tap of the first transformer respectively, and the third synchronous rectification set and the fourth synchronous rectification set are located nearby the secondary dotted end tap and the secondary synonyms end tap of the second transformer respectively.

18. The synchronous rectification module according to claim 17, wherein the secondary center tap of the first transformer is located between the secondary dotted end tap and the secondary synonyms end tap of the first transformer, and the secondary center tap of the second transformer is located between the secondary dotted end tap and the secondary synonyms end tap of the second transformer.

19. The synchronous rectification module according to claim 12, further comprising a filter circuit including two secondary filter capacitor sets disposed on the circuit board and located nearby the second synchronous rectification set and the third synchronous rectification set respectively.

20. The synchronous rectification module according to claim 19, wherein the first synchronous rectification set and the second synchronous rectification set are located nearby each other, and the first synchronous rectification set and the second synchronous rectification set are located between the secondary electrically-conductive foil winding of the first transformer and one of the two secondary filter capacitor sets, wherein the third synchronous rectification set and the fourth synchronous rectification set are located nearby each other, and the third synchronous rectification set and the fourth synchronous rectification set are located between the secondary electrically-conductive foil winding of the second transformer and the other of the two secondary filter capacitor sets.

21. The synchronous rectification module according to claim 20, wherein the secondary dotted end tap of the first transformer is located between the secondary synonyms end tap and the secondary center tap of the first transformer, and the secondary center tap of the first transformer is located away from the first synchronous rectification set and the second synchronous rectification set, wherein the secondary dotted end tap of the second transformer is located between the secondary synonyms end tap and the secondary center tap of the second transformer, and the secondary center tap of the second transformer is located away from the third synchronous rectification set and the fourth synchronous rectification set.

22. The synchronous rectification module according to claim 21, wherein the two secondary filter capacitor sets are disposed on the circuit board and located away from each other and nearby two opposite outer edges of the circuit board respectively.

23. The synchronous rectification module according to claim 20, wherein the secondary center tap of the first transformer and the secondary center tap of the second transformer are disposed on the circuit board and located away from each other and nearby two opposite outer edges of the circuit board respectively.

24. The synchronous rectification module according to claim 19, wherein the filter circuit further comprises an filter inductor disposed between the first transformer and the second transformer and electrically connected to the secondary center tap of the first transformer and the secondary center tap of the second transformer, wherein the filter inductor comprises a magnetic core and a conductive bus, the conductive bus is vertical to the circuit board, passes through a hollow portion of the magnetic core and electrically connected to the secondary center tap of the first transformer and the secondary center tap of the second transformer.

25. The synchronous rectification module according to claim 24, further comprising a center tap bus, wherein the center tap bus comprises a first path bus and a second path bus symmetrically disposed along a top edge of the circuit board and inserted on the circuit board, wherein the first path bus and the second path bus are electrically connected to the secondary center tap of the first transformer and the secondary center tap of the second transformer respectively.

26. The synchronous rectification module according to claim 25, wherein the first path bus, the second path bus and the conductive bus are constructed in one-piece.

27. The synchronous rectification module according to claim 12, wherein each of the first synchronous rectification set, the second synchronous rectification set, the third synchronous rectification set and the fourth synchronous rectification set comprises a plurality of synchronous rectifiers, wherein the synchronous rectifiers are connected to each other in parallel.

28. The synchronous rectification module according to claim 12, wherein the secondary electrically-conductive foil winding comprises a plurality of conductive sheet units, and the primary winding is disposed between two adjacent conductive sheet units, wherein each of the conductive sheet units is a copper sheet.

\* \* \* \* \*